(12) United States Patent
Morgan et al.

(10) Patent No.: US 9,599,191 B2
(45) Date of Patent: Mar. 21, 2017

(54) FERRULE CONFIGURATION

(71) Applicant: Bekaert Wire Ropes Pty Ltd, Sydney (AU)

(72) Inventors: Andrew Morgan, Whitebridge (AU); Wilfred de Sain, Valentine (AU)

(73) Assignee: Bekaert Wire Ropes Pty Ltd, Sydney, New South Wales (AU)

( * ) Notice: Subject to any disclaimer, the term of this patent is extended or adjusted under 35 U.S.C. 154(b) by 0 days.

(21) Appl. No.: 14/354,696

(22) PCT Filed: Oct. 25, 2012

(86) PCT No.: PCT/AU2012/001301
§ 371 (c)(1),
(2) Date: Apr. 28, 2014

(87) PCT Pub. No.: WO2013/059869
PCT Pub. Date: May 2, 2013

(65) Prior Publication Data
US 2015/0176677 A1    Jun. 25, 2015

(30) Foreign Application Priority Data
Oct. 28, 2011 (AU) .................................. 2011904494

(51) Int. Cl.
*F16G 11/04* (2006.01)
*F16G 11/02* (2006.01)

(52) U.S. Cl.
CPC .............. *F16G 11/04* (2013.01); *F16G 11/02* (2013.01); *Y10T 24/3909* (2015.01);
(Continued)

(58) Field of Classification Search
CPC .......... F16G 11/00; F16G 11/02; F16G 11/04; F16G 11/14; Y10T 403/7039;
(Continued)

(56) References Cited

U.S. PATENT DOCUMENTS 1,585,688 A    5/1926 Perry
1,793,884 A    2/1931 Church
(Continued)

FOREIGN PATENT DOCUMENTS

GB    681550 A  * 10/1952   .............. F16G 11/00
GB    681566 A  * 10/1952   .............. B66B 7/06
(Continued)

OTHER PUBLICATIONS

Office Action from U.S. Appl. No. 14/306,800.

*Primary Examiner* — William Miller
(74) *Attorney, Agent, or Firm* — The Webb Law Firm

(57) ABSTRACT

A ferrule 10 for attachment to an end of a wire rope R is disclosed. The ferrule comprises an open end 12 into which the end of the wire rope can be received for securement in the ferrule. The ferrule also comprises an end 14 that opposes the open end. The ferrule further comprises an axis $A_x$ extending between the open and opposing ends. The ferrule is configured at or around at least one of the open and opposing ends such that the ferrule is able to mate with a corresponding formation of a socket 50 into which the ferrule can be received in use. Also disclosed is a socket 50 adapted to the ferrule, and a mechanism for axially locking the ferrule in the socket.

19 Claims, 11 Drawing Sheets

(52) U.S. Cl.
CPC ...... *Y10T 24/3969* (2015.01); *Y10T 29/49826* (2015.01); *Y10T 403/7039* (2015.01)

(58) Field of Classification Search
CPC ........... Y10T 29/49826; Y10T 24/3969; Y10T 24/3909; Y10T 16/39; Y10T 16/42
USPC ......... 16/108, 109; 29/428; 24/136 R, 122.6; 403/361
See application file for complete search history.

(56) References Cited

U.S. PATENT DOCUMENTS

| | | | |
|---|---|---|---|
| 3,240,526 A * | 3/1966 | Schopf | B60P 7/0807 29/283 |
| 3,289,259 A | 12/1966 | Laharty | |
| 3,464,093 A | 9/1969 | Laharty | |
| 3,816,012 A | 6/1974 | Hubbell | |
| 3,844,601 A | 10/1974 | Rochester, Jr. | |
| 3,901,610 A | 8/1975 | Mason | |
| 4,059,866 A * | 11/1977 | Rohland | F16G 11/02 16/108 |
| 4,824,303 A | 4/1989 | Dinger | |
| 4,845,814 A | 7/1989 | Crook | |
| 5,156,647 A | 10/1992 | Ries | |
| 5,472,353 A | 12/1995 | Hristake et al. | |
| 5,505,511 A | 4/1996 | Heal | |
| 5,553,360 A | 9/1996 | Lucas et al. | |
| 5,779,388 A | 7/1998 | Yamamoto | |
| 6,003,210 A | 12/1999 | Facey et al. | |
| 6,913,392 B2 * | 7/2005 | Grzegorzewska | G02B 6/3869 385/60 |
| 7,063,299 B2 | 6/2006 | Facey et al. | |
| 7,346,963 B2 | 3/2008 | Takahashi | |
| 7,472,502 B2 | 1/2009 | Gregory et al. | |
| 7,543,415 B2 | 6/2009 | Svendsen | |
| 7,797,894 B1 | 9/2010 | Sorkin | |
| 2005/0230076 A1 * | 10/2005 | Gregory | B22D 19/00 164/54 |
| 2007/0119562 A1 * | 5/2007 | Gregory | B22D 19/04 164/54 |
| 2008/0282511 A1 | 11/2008 | Chou et al. | |
| 2010/0104377 A1 | 4/2010 | Campbell et al. | |
| 2011/0176867 A1 | 7/2011 | Mosier et al. | |
| 2012/0102679 A1 * | 5/2012 | Doan | E02F 3/58 24/115 R |
| 2013/0047572 A1 * | 2/2013 | Morgan | B21D 39/04 57/200 |

FOREIGN PATENT DOCUMENTS

| | | |
|---|---|---|
| WO | 9508728 A1 | 3/1995 |
| WO | 2011103640 A1 | 9/2011 |

* cited by examiner

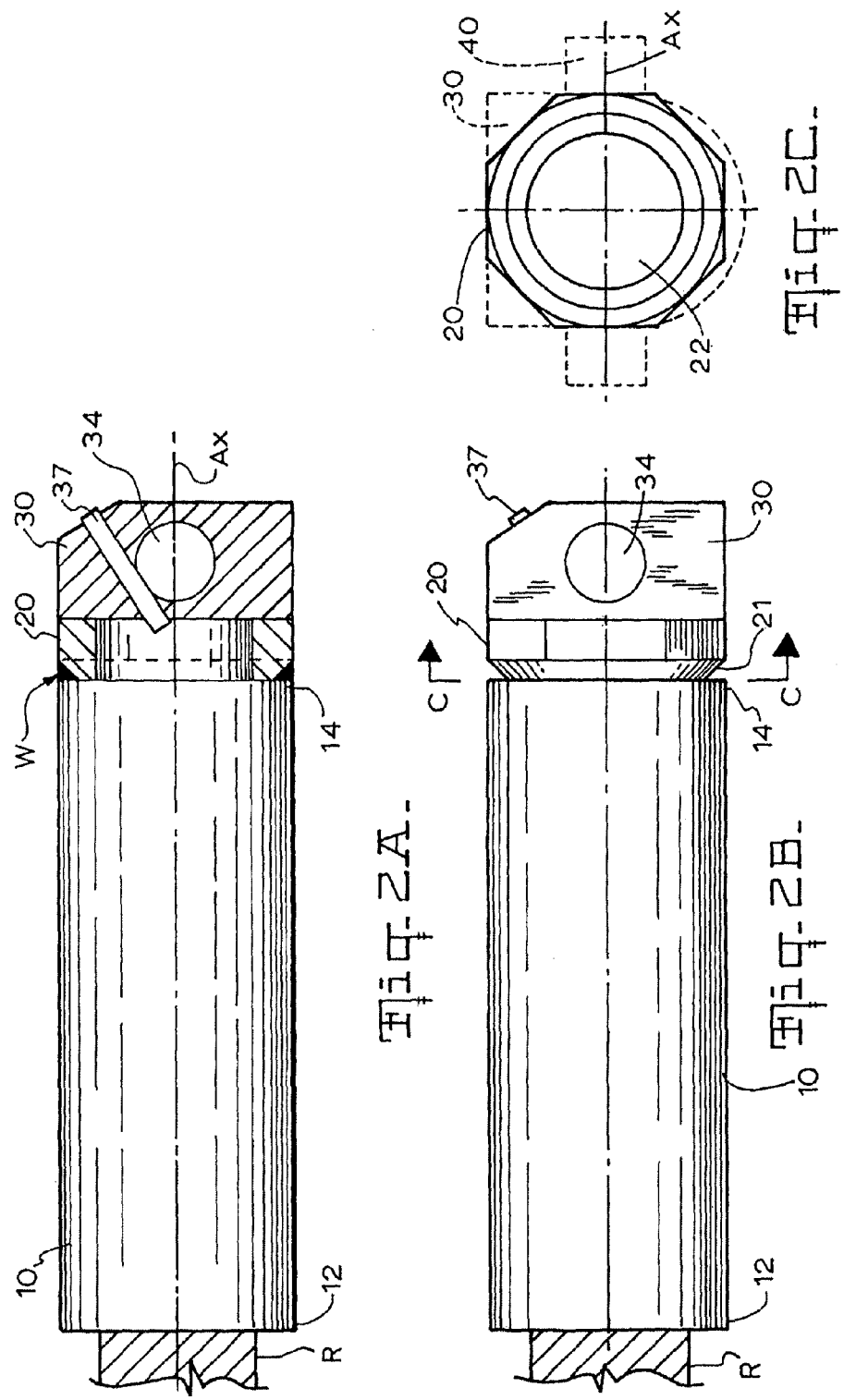

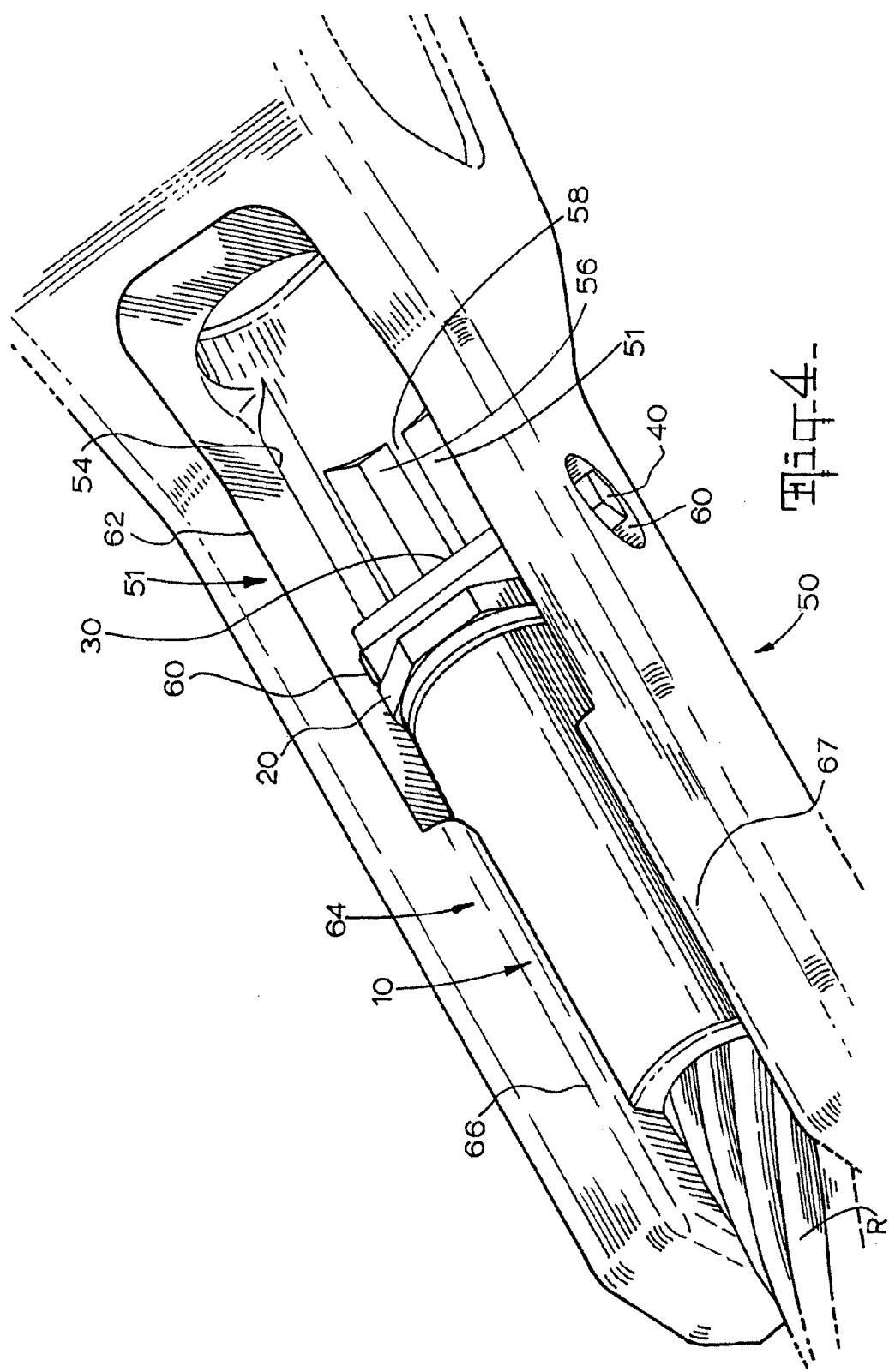

FERRULE CONFIGURATION

TECHNICAL FIELD

Disclosed is a ferrule for a wire rope, the ferrule having a configuration that facilitates its location in a so-called socket. The socket may, for example, form part of a dragline hoist and/or rigging assembly though is not limited to this application. In addition, the ferrule finds particular, though not exclusive, application as part of a dragline rope, for example, a dragline dump rope, and will in part be described in this context. However, it is to be appreciated that the ferrule configuration can be employed with other wire ropes (including steel wire ropes) in a range of applications beyond mining and civil engineering applications.

BACKGROUND ART

Large capacity mining draglines subject a dragline bucket to enormous forces and loads. Ropes (also referred to as "cables") are employed in draglines to control the various movements of the bucket, and accordingly experience extreme and rapid wear, especially at the sheaves in components of the dragline. For example, hoist ropes may need to be replaced every 3-6 months, drag ropes every 1-3 months and dump ropes every 1-2 weeks. Rope replacement is time consuming, with "downtime" of the dragline representing a significant cost in mining operations.

WO 2011/103640 to the present applicant discloses a method for attaching a ferrule to the end of a wire rope to finish that end and to facilitate its attachment to components (e.g. via a socket) in the dragline hoist and/or rigging assembly. The method of WO 2011/103640 can be employed to attach an example ferrule as disclosed herein to a wire rope.

Minimizing the rope changeover time can contribute to downtime reduction and improved operating cost and efficiency of a dragline. Sockets are accordingly employed to assist with rope connection to and disconnection from various components of a dragline rigging and hoist assembly. In this regard, a ferrule on the end of a wire rope can locate and be retained in such a socket.

Components of the forces and loads in draglines can be transferred to the wire ropes which may in turn cause the ferrule on a given rope to twist and/or be shunted within an existing socket. However, with existing sockets, the resultant movement may not be prevented and/or the torque imparted to the ferrule may not be transferred to and absorbed or accommodated by the socket. This can quickly result in damage to or failure of the wire rope, ferrule and/or socket.

The above references to the background and prior art do not constitute an admission that such art forms a part of the common and/or general knowledge of a person of ordinary skill in the art. The above references are also not intended to limit the application of the ferrule and socket disclosed herein.

SUMMARY OF THE DISCLOSURE

In a first aspect there is disclosed a ferrule for attachment to a wire rope end. The wire rope may, for example, be employed in a dragline (e.g. as part of the hoist and/or rigging of the dragline) but is not limited to this application.

The ferrule comprises an open end into which the end of the wire rope can be received for securement in the ferrule (e.g. via a die-press method such as disclosed in WO 2011/103640).

The ferrule comprises an end that opposes the open end. An axis of the ferrule extends between the open and opposing ends.

The ferrule is configured at or around at least one of the open and opposing ends such that the ferrule is able to mate with a corresponding formation of a socket into which the ferrule can be received in use. The ferrule may also be configured around both of the open and opposing ends, whereby the ferrule can mate with corresponding opposed formations of the socket.

This configuring of the ferrule may involve a reconfiguration of part of the ferrule itself and/or the securing of a part/component to the ferrule. In either case, the configuring of the ferrule at or around at least one of the open and opposing ends enables the ferrule to mate with a corresponding formation of the socket, to help prevent the ferrule from rotating or twisting within the socket when in use. This can, for example, better allow torque that is transferred from the wire rope to the ferrule to be on-transferred to and absorbed or accommodated by the socket, and can extend the working life of the ferrule, wire rope end and socket. Such configuring of the ferrule is to be contrasted with the distal ferrule lug of WO 2011/103640 which is not in any way configured to the socket.

The configuring of the ferrule may also be such as to mate with an existing formation of a socket (e.g. the ferrule can be configured to a pre-existing, known socket). Alternatively, the socket may be modified and configured so as to suit the modified ferrule configuration. In this later case, the ferrule and socket are "designed" to each other.

In one embodiment at least one of the open and opposing ends may be configured to mate with the corresponding formation of the socket for multiple rotational orientations of the ferrule around its axis. Thus, a wire rope to which the ferrule is attached need not be rotated, twisted or unrolled to any significant extent to enable the ferrule to be located in and to mate with the corresponding formation of the socket. This is again to be contrasted with the distal ferrule lug of WO 2011/103640 which can only be pinned in the socket in one orientation.

In one variation of the ferrule, a component may be secured to the opposing end. In one embodiment, the component may have a polygon-shaped profile. At least two opposing sides of the polygon-shaped profile may be configured to mate with a corresponding formation in the socket in use.

When the polygon-shaped profile has an even number of sides (e.g. four, six, eight, ten, etc), these may be suited to existing opposing and facing surfaces provided within the socket for mating with the polygon-shaped profile (e.g. in a close-facing or abutting relationship). Alternatively, such surfaces may be added into the socket.

In another embodiment, the component may have a U-shaped profile. At least two opposing sides of the U-shaped profile may be configured to mate with a corresponding formation in the socket in use.

In one embodiment the distance between opposing sides in the polygon- or U-shaped profile may be equal to or greater than a diameter of the ferrule at the open end (i.e. so that the component rather than the ferrule interacts with the socket facing surfaces).

The interaction of these surfaces with the component can allow torque that is transferred from the wire rope to the ferrule to be on-transferred to and absorbed or accommodated by the socket to extend the working life of the ferrule, wire rope end and socket.

In one embodiment an edge of the component may be chamfered around a surface that faces in to secure to the opposing end. This chamfer can, for example, allow for the component to be welded onto the opposing end of the socket (i.e. without the weld protruding beyond the component such as by any significant extent). In another embodiment an inner face of the component may be modified (e.g. by drilling) to enable the component to be forced onto the opposing end of the socket such as by an interference or friction fit.

In one embodiment the component may be formed from plate (e.g. steel plate). When formed from plate, the component may be cut (e.g. flame cut), machined, etc to define a squat section (e.g. not overly thick).

Further, a central opening may be provided through the component (e.g. by being pre- or post-formed through the plate). In one embodiment the central opening may take the form of a hole. Further, the hole may have a diameter that generally corresponds to the diameter of the wire rope at the opposing end of the ferrule. Thus, any protruding wire rope at the ferrule opposing end may be received in and even accommodated and protected by the component.

In another variation the ferrule may comprise a series of spaced, discrete lugs at the open end. These ferrule lugs may be integrally formed in the ferrule, and may project to define a castellated profile at the open end. Such a configuration can be easily formed at the ferrule open end such as by machining, cutting (e.g. flame cut), etc.

In one embodiment the socket may comprise one or more corresponding lugs. Such corresponding socket lugs may be pre-existing or may be formed into the socket to make it suitable for receiving and mating with the ferrule lugs. Each socket lug may be arranged to locate between adjacent respective ferrule lugs at the ferrule open end when the ferrule has been received in the socket in use. Such a configuration has been observed to provide very effective mating to stop the ferrule from rotating or twisting within the socket, and to allow torque from the wire rope to be on-transferred to the socket.

In one embodiment of the ferrule a radius or radial groove may be provided on either side of each ferrule lug where it is connected to a remainder of the ferrule. These radii or grooves can ensure material integrity, transitioning from the ferrule lug to the ferrule remainder, so that there is no point of weakness at this location (e.g. which may otherwise result in ferrule failure when it is being secured to the wire rope or in use).

In one embodiment of the ferrule, an outwardly facing surface of each ferrule lug may be chamfered prior to attaching the ferrule to a wire rope end. For example, each chamfer may be provided such that it extends beyond the lug and into a remainder of the ferrule. The chamfer on each lug can function to assist with the preservation of a consistent shape of the ferrule 100 after it has been die-pressed onto a wire rope.

In one embodiment the ferrule may comprise up to four or more lugs spaced equidistantly from each adjacent lug at and around the open end.

The wire rope with the ferrule of the first aspect secured thereto can, for example, be used in a dragline.

In a second aspect there is disclosed a ferrule for attachment to a wire rope end. The ferrule comprises an open end into which the end of the wire rope can be received for securement in the ferrule.

The open end is configured for mating engagement with a corresponding formation of a socket into which the ferrule can be received in use. This configuration of the ferrule open end is to be contrasted with the distal ferrule lug of WO 2011/103640.

In the ferrule of the second aspect the open end may be as defined as per the other variation of the ferrule as set forth above for the first aspect.

In the second aspect an opposing end of the ferrule itself may alternatively or additionally be configured for mating engagement with a corresponding formation of the socket into which the ferrule can be received in use.

In a third aspect there is disclosed a socket that is modified to receive therein a ferrule according to the first or second aspects. The socket may form part of a dragline hoist and/or rigging assembly.

In one embodiment, the socket may be modified for receiving the component at the ferrule opposing end. For example, the socket may be provided with internal surfaces (e.g. preformed internal walls) for locating at respective sides of the polygon- or U-shaped profile to mate therewith (e.g. to abut or closely face).

Alternatively or additionally, the socket may be modified for receiving the component at the ferrule open end (e.g. when it has the series of spaced, discrete lugs formed at the open end). For example, one or more corresponding lugs may be provided in a cavity of the socket, with each socket lug arranged to be received between two corresponding adjacent ferrule lugs in use.

In a fourth aspect there is disclosed a wire rope comprising thereon a ferrule according to the first or second aspects. The wire rope may take the form of a dragline rope.

In a fifth aspect there is disclosed a component for securing to a distal end of a ferrule. The ferrule may in turn be attached to a wire rope end. The component can be as defined in the first aspect (e.g. polygon-shaped, U-shaped profile, etc). Further, the ferrule to which the component is mounted may be as defined in the first or second aspects.

In a sixth aspect there is disclosed a locking assembly for locking a ferrule in a corresponding socket into which the ferrule can be received in use. The ferrule may, for example, be as defined in the first aspect. For example, the ferrule may be configured for attachment to a wire rope end and may comprise an open end into which the end of the wire rope can be received for securement in the ferrule, and an end opposing the open end.

In accordance with the sixth aspect, the locking assembly comprises a block that is able to be positioned and secured in the socket adjacent to the opposing end of the ferrule. The locking assembly can function to prevent the ferrule from shifting or shunting forward in the socket in use, whereby the ferrule may potentially fall out of the socket.

In one embodiment the locking assembly may further comprise a bolt for extending through aligned holes of the locking block and socket to secure the locking block to the socket in use. The bolt may, for example, make use of holes that are present in a pre-existing socket. For example, the bolt may be adapted to extend from one side of the socket, though a hole at that side, through an aligned hole of the locking block and though an opposing hole at an opposite side of the socket to secure the locking block to the socket in use.

In one embodiment the locking assembly may further comprise a retention pin that extends through the locking block and into engagement with the bolt to secure the bolt to the locking block in use.

A socket may be supplied with and adapted for use with the locking assembly of the sixth aspect.

In a seventh aspect there is disclosed a method of securing a ferrule according to the first aspect in a socket according to the third or sixth aspect. The method comprises locating the ferrule so as to mate with the corresponding formation of the socket. The method also comprises securing the ferrule against axial movement within the socket.

For example, the ferrule may be secured against axial movement within the socket using a locking assembly in accordance with the sixth aspect.

BRIEF DESCRIPTION OF THE DRAWINGS

Notwithstanding any other forms which may fall within the scope of the ferrule and socket as set forth in the Summary, specific embodiments will now be described, by way of example only, with reference to the accompanying drawings in which:

FIGS. 2A to 2C respectively show partly sectioned side, side and end views of the ferrule of FIG. 1;

FIG. 4 shows a perspective view of the ferrule of FIGS. 1 and 2 located in a cavity of a socket, with the locking assembly (shown in ghosting) locking the ferrule against axial movement in a socket;

DETAILED DESCRIPTION OF A SPECIFIC EMBODIMENT

Figure 1:
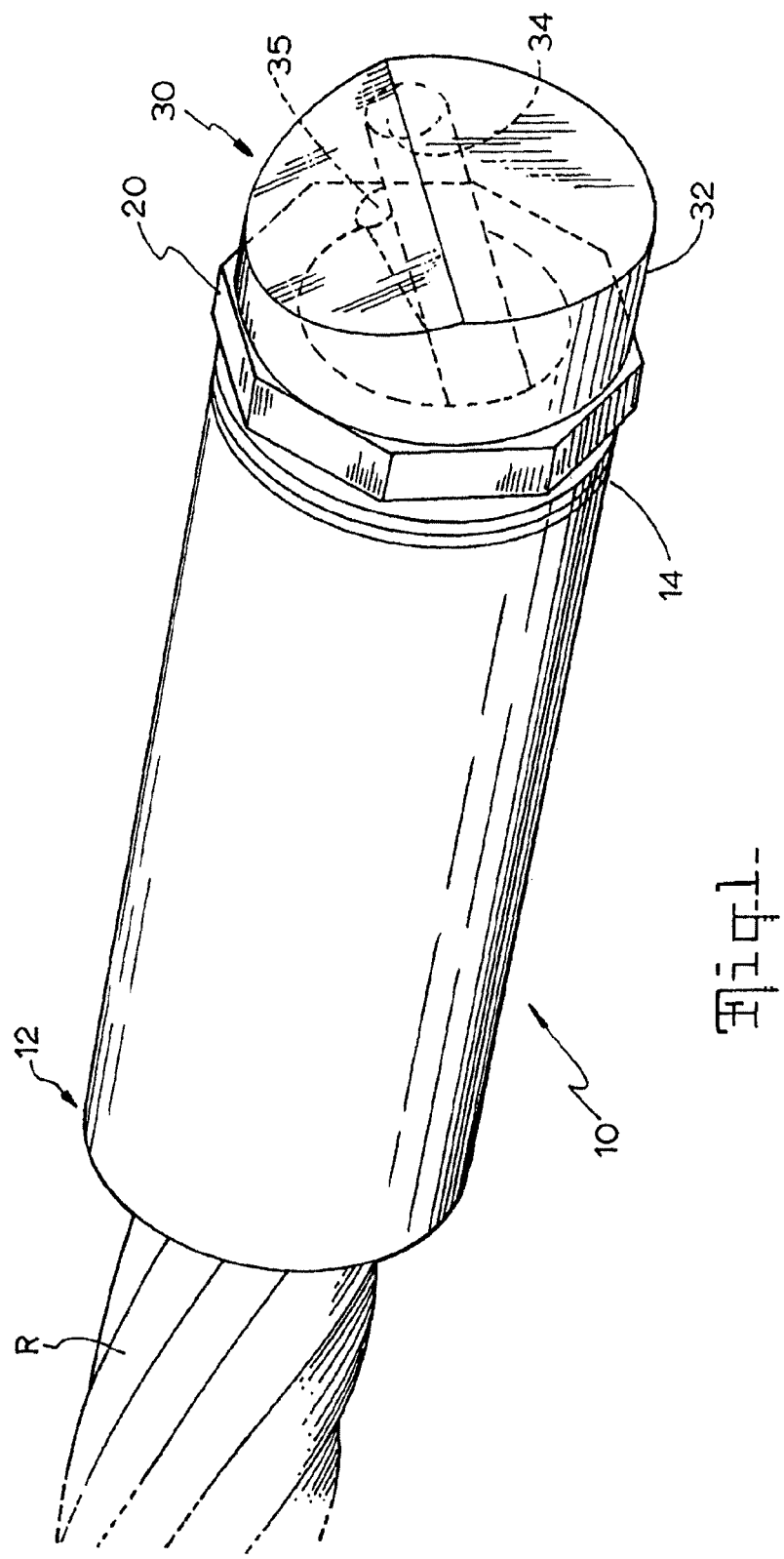
FIG. 1 shows a perspective view of a first embodiment of a ferrule secured to an end of a wire rope, illustrating a component secured to a distal end of the ferrule, as well as (in ghosting outline) a locking assembly for locking the ferrule against axial movement in a socket.

Referring firstly to FIGS. 1 to 5 a first embodiment of a ferrule 10 is shown for attachment to an end of a wire rope R. The wire rope may, for example, be employed in a dragline (e.g. as part of the hoist and/or rigging of the dragline) but is not limited to this application. The socket in which the ferrule is to be located can also form part of a dragline hoist and/or rigging assembly.

The ferrule 10 comprises an open proximal end 12 into which the end of the wire rope R can be received for securement in the ferrule (e.g. via the die-pressing method of WO 2011/103640). The ferrule 10 also comprises an opposing distal end 14 (i.e. that opposes the proximal end 12). An axis $A_x$ of the ferrule 10 (FIG. 2) extends between the proximal and distal ends 12, 14.

In the embodiment of FIGS. 1 to 5, the ferrule 10 is configured around the distal end 14 to mate (e.g. abut or closely face) with a socket 50. The socket 50 may be unmodified, whereby the ferrule 10 is modified and configured to a pre-existing cavity 51 within the socket so as to be mate therewithin in use. Alternatively, the socket 50 may be provided with a modified cavity 51 into which the ferrule 10 can be received for mating in use.

In either case, this mating engagement functions to stop the ferrule from rotating or twisting within the socket in use, thereby allowing torque that is transferred from the wire rope R to the ferrule to be better on-transferred to and absorbed or accommodated by the socket. This can extend the working life of each of the ferrule, wire rope end and socket.

In addition, the ferrule 10 may be configured around the distal end 14 so that it is able to mate with the socket 50 at a given one of a number of rotational orientations of the ferrule around its axis $A_x$. Thus, the wire rope need not be rotated, twisted or unrolled to any significant extent to enable the ferrule to be easily and correctly located in the socket cavity.

This is to be contrasted with the distal ferrule lug of WO 2011/103640 which can only be pinned in the socket in one orientation, which can be quite problematic out in the field of use.

In the embodiment of FIGS. 1 to 5, to configure the distal end 14 of the ferrule 10, a component in the form of a key-in plate 20 is secured (e.g. welded) to the distal end 14. The plate 20 enables torque that is transferred from the wire rope to the ferrule to be on-transferred to and absorbed or accommodated by the socket. An edge of the plate 20 may be chamfered 21 at the surface that faces in to the distal end 14 to be secured thereto. This chamfer can allow for the plate 20 to be welded W (FIG. 2A) onto the distal end of the socket whereby the weld W does not need to protrude beyond the plate by any significant extent. The weld W may extend circumferentially around the plate 20, or comprise discrete weld regions.

In a variation, the plate 20 can be modified to enable it to secure a lifting lug at the wire rope end. For example, the plate may be solid and be formed with the lifting lug already secured thereto. The solid plate can be suitably drilled at its inside face (i.e. the face that secures to the distal end 14 of ferrule 10 in use) to enable the plate 20 to be friction or interference fit thereto (e.g. tapped onto the ferrule distal end 14 with a suitable tool such as a hammer).

In the embodiment of FIGS. 1 to 5, the plate 20 is provided with a polygon-shaped profile in the form of an octagon. The plate 20 may be flame-cut or machined from metal plate, such as steel, to have the polygon-shaped profile. In side elevation, the plate 20 defines a squat cylindrical section (e.g. it is not overly and unnecessarily thick). However, the polygon-shaped profile can, for example, be provided with other even numbers of sides (e.g. four, six, ten, etc). In this case, it may be square, rectangular, diamond-shaped, rhombus- or trapezoidal-shaped, or hexagonal, decahedron, etc. The plate may even have an uneven number of sides (e.g. five, seven, nine, etc).

Figure 5:
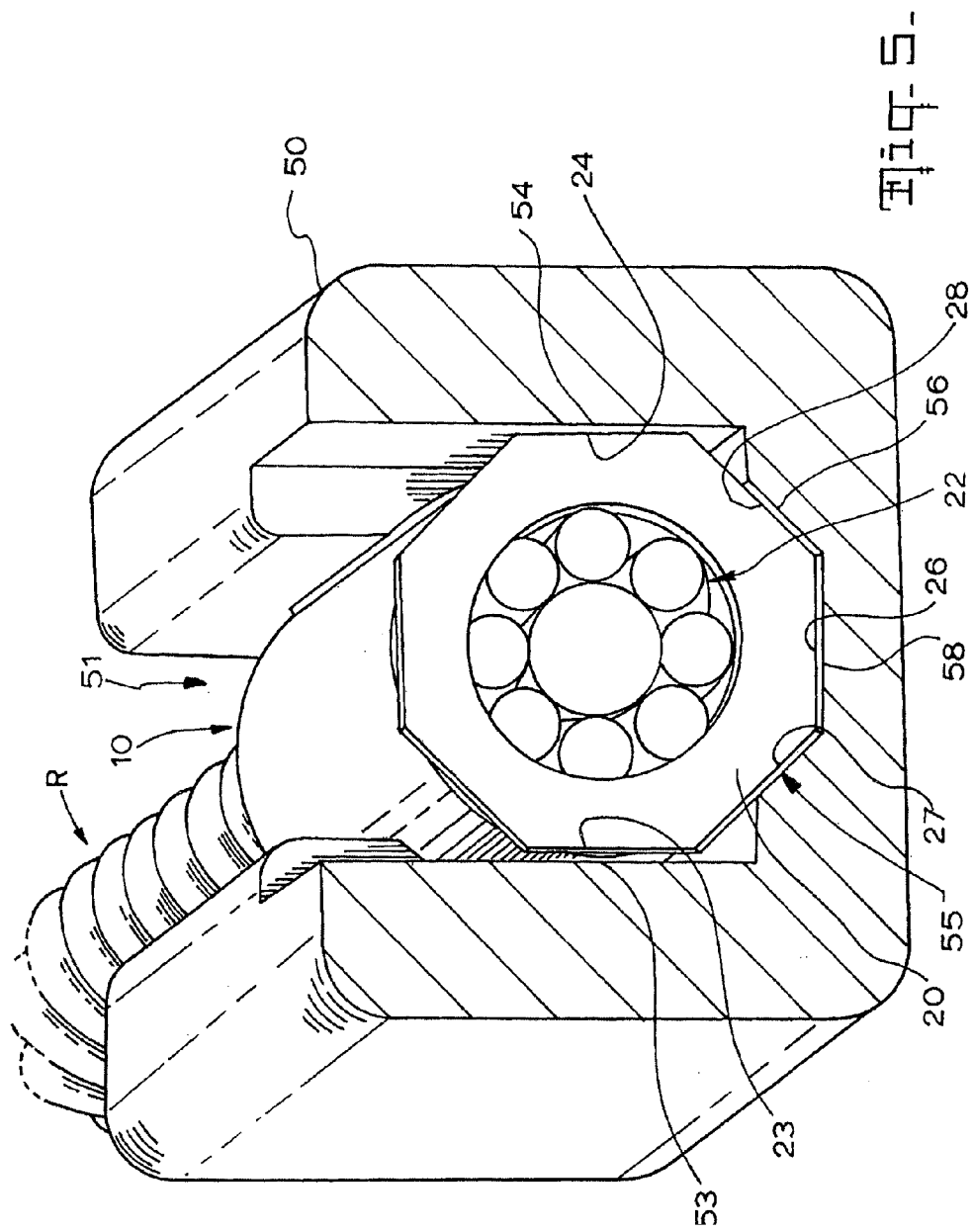
FIG. 5 shows a sectional perspective view through the socket of FIG. 4, showing the component at the end of the ferrule and its interaction with the socket.
Figure 6:
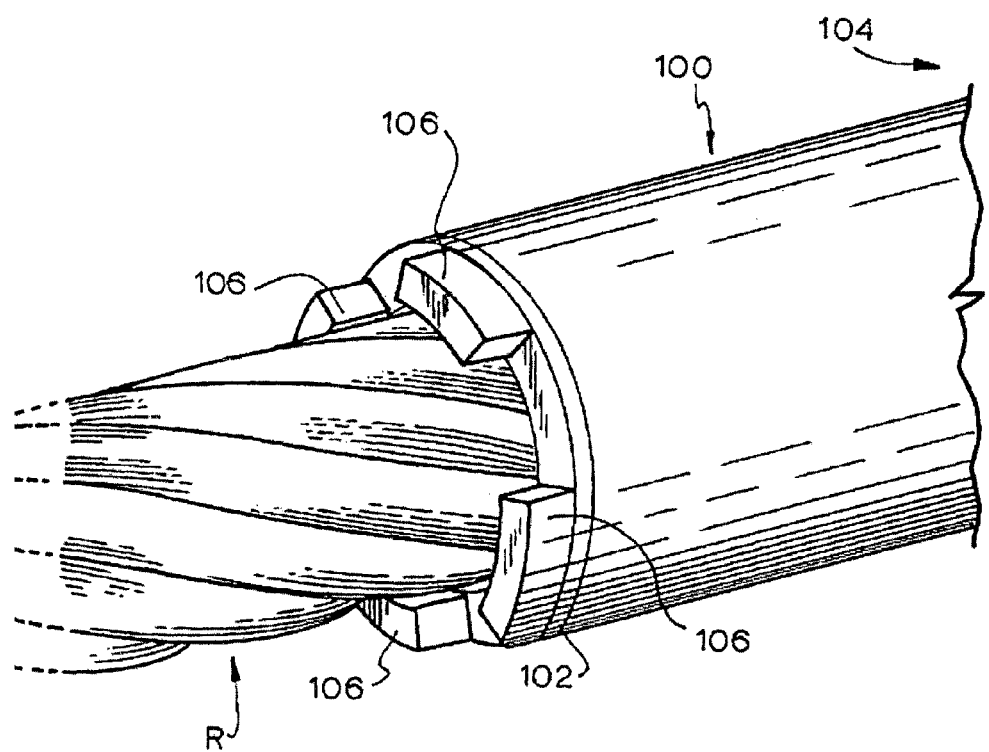
FIG. 6 shows a perspective view of a second embodiment of a ferrule secured to an end of a wire rope, illustrating a formation at a proximal end of the ferrule.

The plate 20 is provided with a central opening in the form of a hole 22 therethrough (e.g. that is pre- or post-formed through the plate). As best shown in FIG. 5, the hole 22 has a diameter that generally corresponds to the diameter of the wire rope at the distal end of the ferrule 10. Thus, any protruding wire rope at the ferrule distal end can be received in, and be accommodated and protected by the plate 20 (i.e. the plate 20 surrounds such protruding wire as shown in FIG. 5).

In one embodiment of the socket 50, when the cavity 51 is unmodified, the plate 20 is modified to interact just with the opposing internal walls 53 and 54 of the socket cavity 51 (see FIG. 5). In this regard, the wall formations 55, 56 and 58 of the socket 50 shown in FIG. 5 may not require modification, and the sides 26, 27 and 28 shown in FIG. 5 of plate 20 may be modified accordingly.

However, as shown in FIG. 5, five sides of the octagon-shaped profile of the plate 20 can be configured to mate with a corresponding formation within the socket cavity 51 in use. In particular, two opposing sides 23 and 24 of the octagon-shaped profile can mate (e.g. closely face or abut) in use with opposing internal walls 53 and 54 of the socket cavity 51. In addition, lower side 26, and a portion of each of the sides 27 and 28 of the octagon-shaped profile, can mate (e.g. closely face or abut) with angled walls 55 and 56, and base 58 of the socket 50. This configuration maximises keying-in of the ferrule in socket cavity 51.

The plate 20 is also typically configured such that the distance between opposing sides (e.g. sides 23 and 24) in the polygon-shaped profile is equal to or greater than a diameter of the ferrule at the distal end 14, so that the plate 20, rather than the ferrule, interacts with the socket walls (e.g. opposing walls 53 and 54).

Figure 3A:
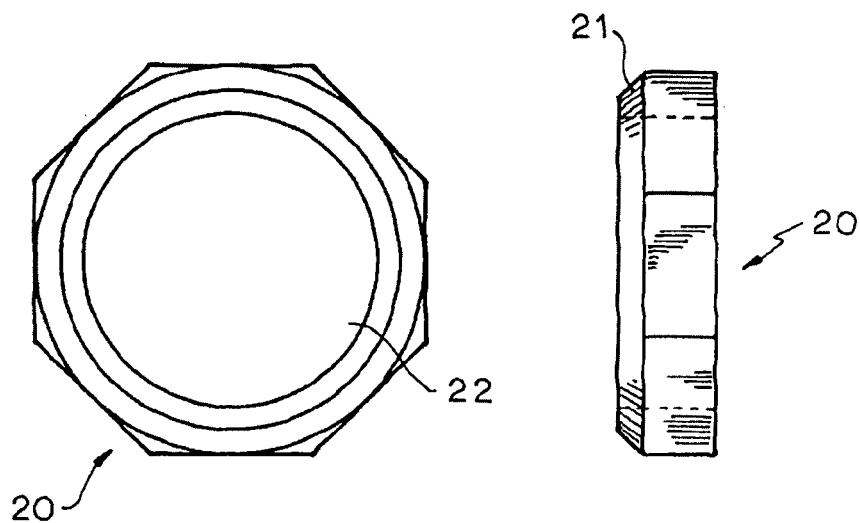
FIGS. 3A to 3C respectively show front and side views of each of the component and parts of the locking assembly (i.e. as illustrated in ghosting in FIGS. 1 and 2)
Figure 3B:
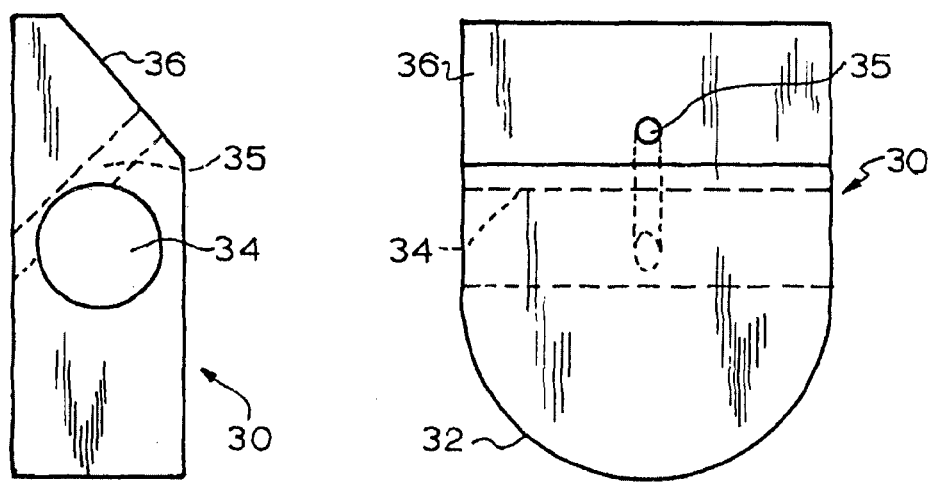
Figure 3C:
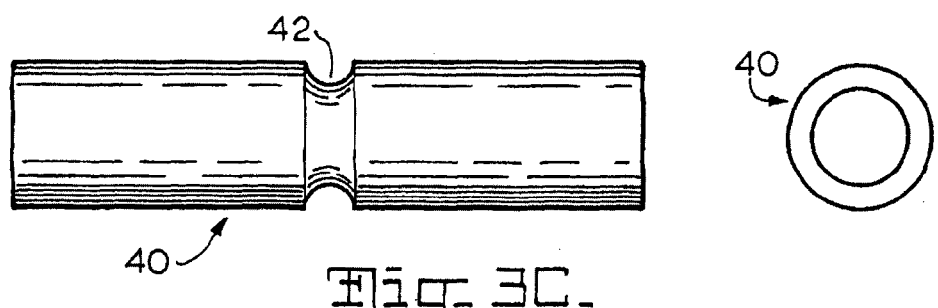

In any case, to prevent the ferrule 10 from shifting or shunting forward axially in the socket cavity 51 in use (i.e. whereby the ferrule can potentially fall out of the socket) a locking assembly in the form of locking components can be employed, as best shown in FIGS. 2, 3B and 3C. The locking components can be used with both the ferrule 10 and socket 50, and the ferrules 100, 200 and sockets 120, 220 (described below).

The locking components include a locking block 30 that is able to be positioned and secured in the socket cavity 51 adjacent to the plate 20 at the distal end 14 of the ferrule 10, as best shown in FIG. 4. The locking block 30 can be freely located or may be pre-secured to the plate 20 (e.g. by welding, grub screws, etc). In the latter case, the locking block can load into socket cavity 51 together with the ferrule 10.

The locking block 30 has a curved base 32 that can abut with angled walls 55 and 56, and base 58 of the socket 50. The locking block 30 also has a transverse bolt hole 34 extending therethrough, and an angled spring-pin hole 35 that extends downwardly therein from a rear angled face 36 of the block 30 to partially intersect with bolt hole 34 (FIG. 3A). The spring-pin hole 35 can receive a spring-loaded retention pin 37 therein (FIGS. 2A and 2B).

The locking components can also include a bolt 40 for extending through the transverse bolt hole 34 that extends through the locking block 30. The bolt includes a spring pin retention groove 42 intermediate its ends. When the retention pin 37 extends through the spring-pin hole 35 of the block 30, a portion of the pin protrudes into bolt hole 34 (FIG. 2A), and this portion can locate in and engage with the groove 42 of bolt 40 to secure the bolt to the locking block 30 in use. This in turn secures the locking block 30 to the socket 50.

In this regard, and as best shown in FIG. 4, when opposing holes 60 of the socket 50 are aligned with bolt hole 34 of locking block 30, the bolt 40 can be inserted from one side of the socket though a hole 60, through aligned bolt hole 34, and though an opposing hole 60 at an opposite side of the socket to secure the locking block to the socket in use. The holes 60 can be pre-existing (i.e. already present in a pre-existing socket).

FIG. 4 also shows that cavity 51 comprises wider and narrower sections 62 and 64 respectively. The ferrule 10 can initially be dropped into the wider cavity section 62, and can then be pulled back axially to locate under and be retained by overlying opposed lips 66, 67 of the narrower cavity section 64. This configuration can also be present in sockets 120 and 220.

Figure 7:
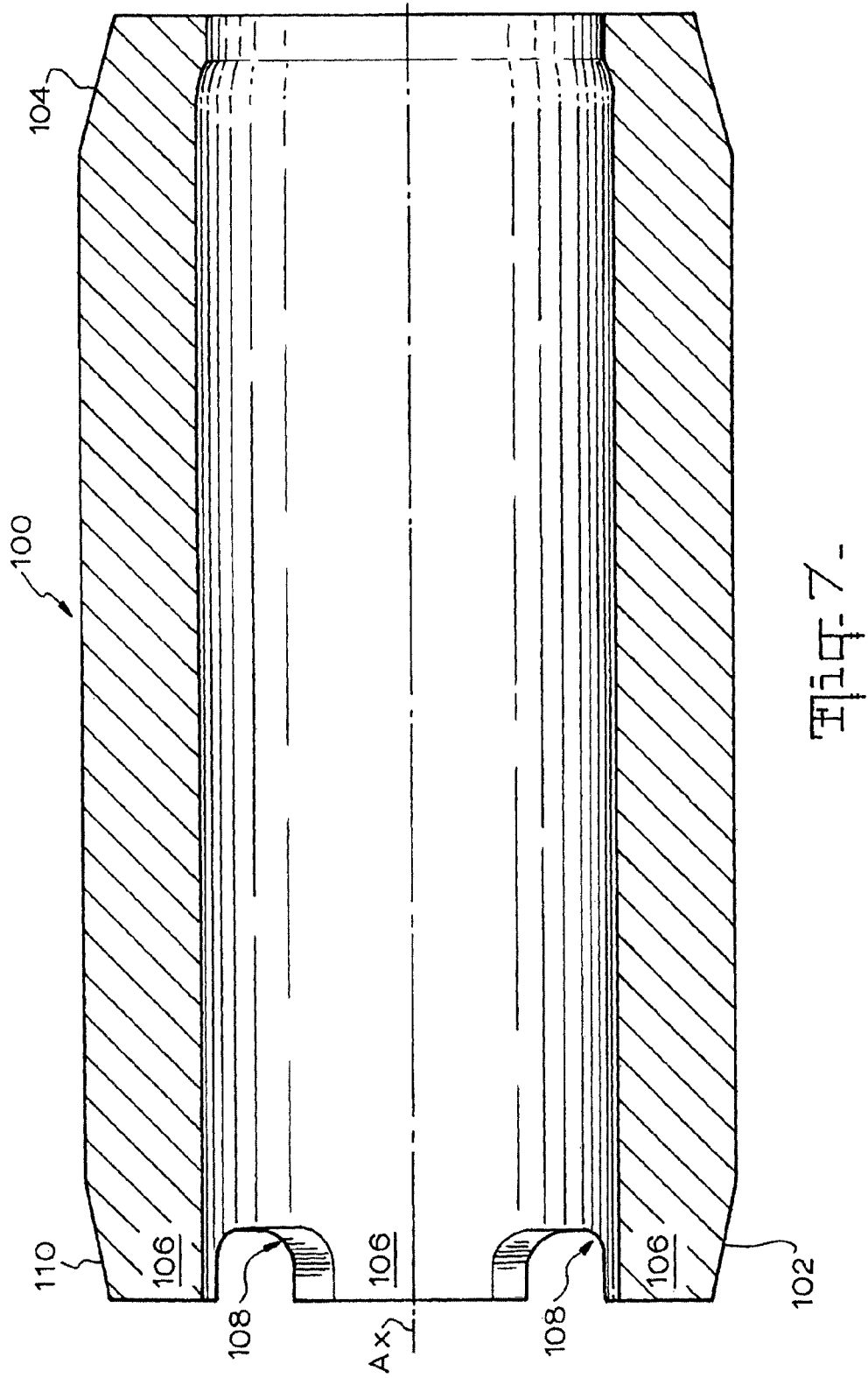
FIG. 7 shows a sectional side view through the ferrule of FIG. 6 prior to it being attached (e.g. die-pressed0 to a wire rope end.
Figure 8:
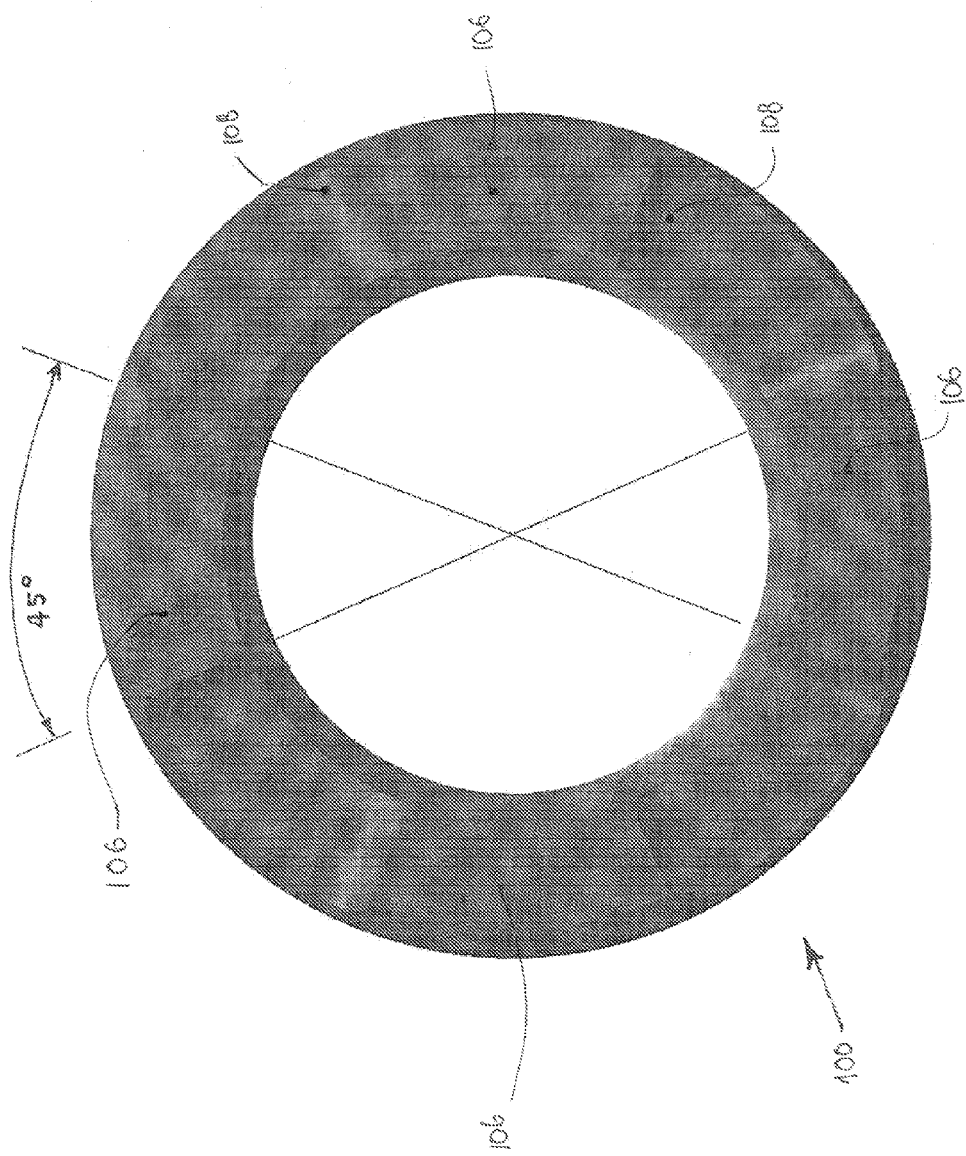
FIG. 8 shows an end view of the ferrule of FIG. 7.

Referring now to FIGS. 6 to 9 a second embodiment of a ferrule 100 for attachment to an end of a wire rope R is shown. The ferrule 100 comprises an open proximal end 102 into which the end of the wire rope can be received for securement in the ferrule. The ferrule 100 also comprises an opposing distal end 104. The ferrule 100 in FIGS. 7 and 8 is shown in its "undeformed" configuration, namely, prior to being die-pressed onto the wire rope as in FIGS. 6 and 9.

In the embodiment of FIGS. 6 to 9, the ferrule 100 is now configured around the proximal end 102 for mating engagement with a socket 120. The socket 120 has a modified cavity in which the ferrule can be received, with a corresponding formation in the cavity mating with the ferrule in use. Again, this mating engagement can occur for a given one of a number of rotational orientations of the ferrule around its axis $A_x$.

In this regard, the ferrule is provided with a series of (e.g. four equidistant) spaced, discrete lugs 106 at the proximal end 102. The lugs 106 project to define a castellated profile at the proximal end. As shown in FIG. 8, the circumferential sweep of each lug 106 is 45°. Such a configuration can be easily formed at the ferrule open end such as by machining, cutting (e.g. flame cutting), etc.

A radius 108 is provided on either side of each ferrule lug 106 where it is connected to a remainder of the ferrule 100. These radii can ensure material integrity, in the transition from the ferrule lug to a remainder (or body) of the ferrule, so that there is no point of weakness at this location. Such weakness could otherwise result in ferrule failure when it is being secured to the wire rope or in use.

Prior to die-pressing the ferrule onto the end of a wire rope, an outwardly facing surface of each ferrule lug 106 may be chamfered 110 (FIG. 7). The chamfer extends beyond the lug and into the body of the ferrule. The chamfer 110 on each lug can function to assist with the preservation of a consistent shape of the ferrule 100 after it has been die-pressed onto a wire rope.

Figure 9:
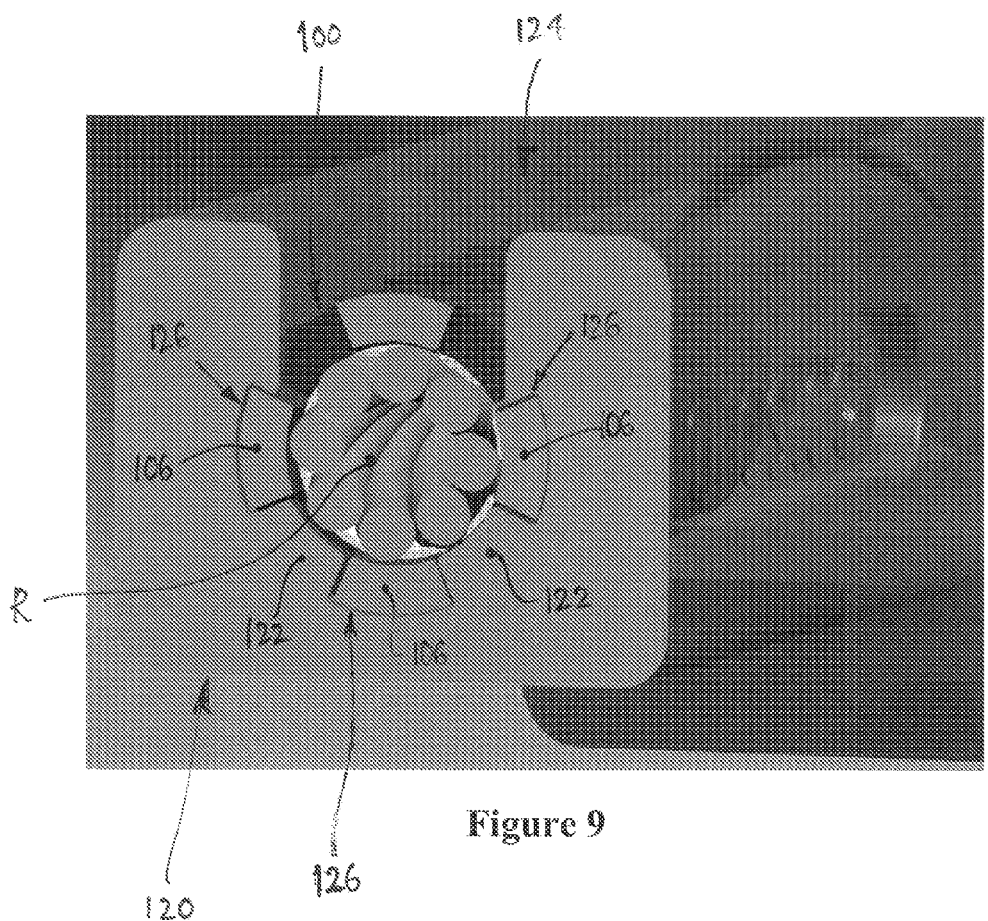
FIG. 9 shows a sectional perspective view through a socket with the ferrule of FIG. 6 located therein, to illustrate the ferrule and its interaction with the socket.

As best shown in FIG. 9, the socket 120 is modified by providing it with corresponding socket lugs 122. Each socket lug 122 is arranged to locate between adjacent respective ferrule lugs 106 when the ferrule 100 is located in the socket cavity 124 in use. In addition, a dovetail recess 126 is defined between each socket lug and into which recess a respective ferrule lug 106 locates in a dovetail fit.

Such a configuration has been observed to provide very effective mating to stop the ferrule 100 from rotating or twisting within the socket cavity 124, and to allow torque from the wire rope to be on-transferred to the socket.

Whilst the ferrule 100 is shown with four lugs 106 spaced equidistantly from each adjacent lug at and around the proximal end, other permutations are possible. For example, as little as a single lug may be sufficient, or e.g. up to six lugs may be employed. The number of socket lugs and/or recesses is then adjusted accordingly.

Figure 10:
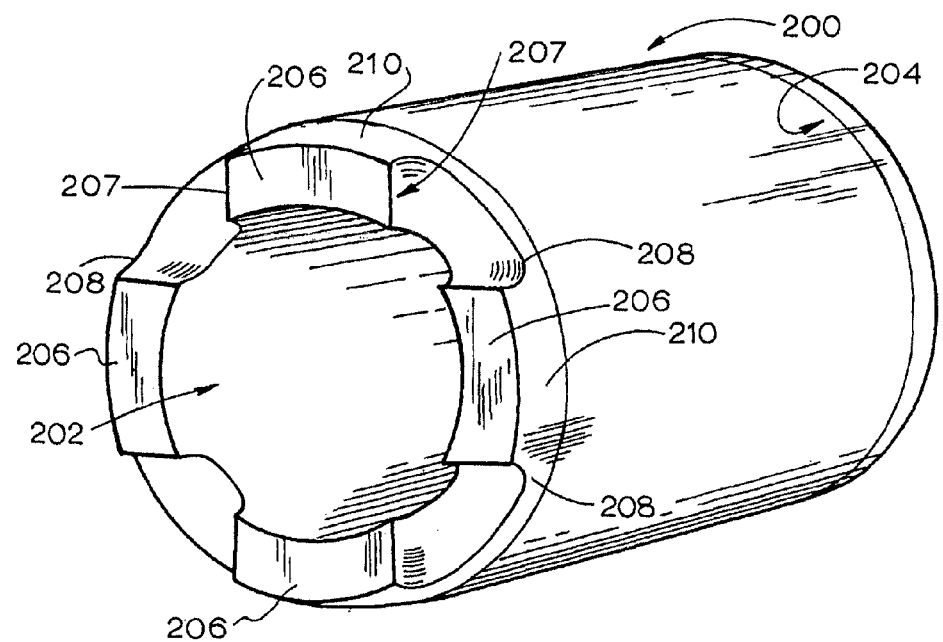
FIG. 10 shows a perspective view of a third embodiment of a ferrule prior to being secured to an end of a wire rope, to illustrate an alternative formation at a proximal end of the ferrule.
Figure 11:
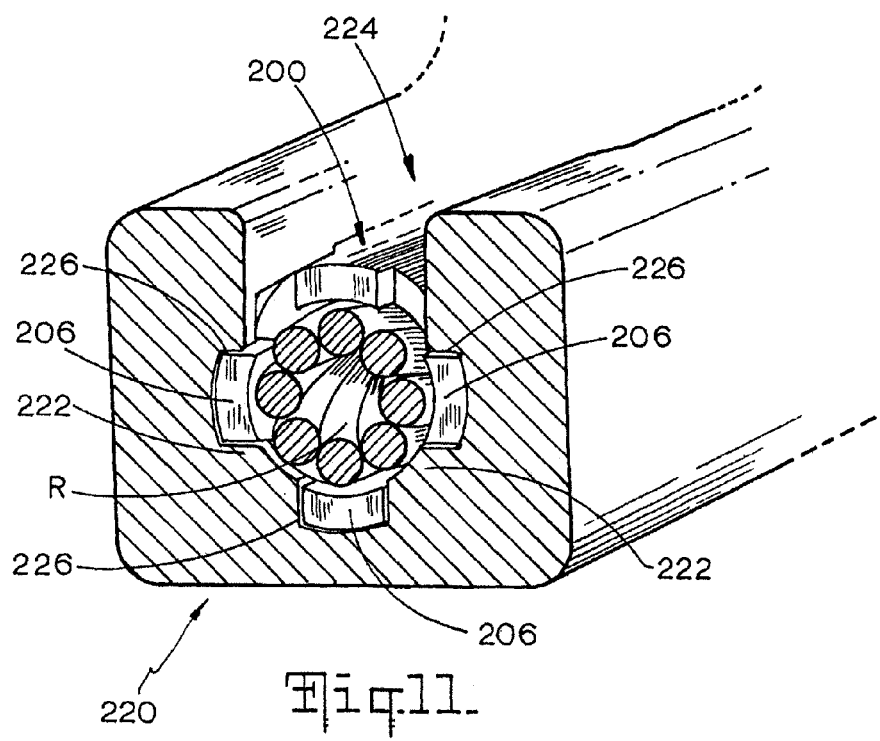
FIG. 11 shows a sectional perspective view through a socket with the ferrule of FIG. 10 attached to a wire rope and located in the socket, to illustrate the ferrule and its interaction with the socket.

Referring now to FIGS. 10 and 11, a third embodiment of a ferrule 200 for attachment to an end of a wire rope R is shown. The ferrule 200 in FIG. 10 is shown in its "undeformed" configuration, namely, prior to being die-pressed onto the wire rope as in FIG. 11.

The ferrule 200 comprises an open proximal end 202 into which the end of the wire rope can be received for securement in the ferrule. The ferrule 100 also comprises an opposing distal end 204.

In the embodiment of FIGS. 10 and 11, the ferrule 200 is again configured around the proximal end 202 for mating engagement with a socket 220. The socket 220 has a modified cavity in which the ferrule 200 can be received, with a corresponding formation in the cavity mating with the ferrule in use. Again, this mating engagement can occur for a given one of a number of rotational orientations of the ferrule around its axis.

In this regard, the ferrule is provided with a series of (e.g. four equidistant) spaced, discrete lugs 206 at the proximal end 202. Again, the lugs 206 project to define a castellated profile at the proximal end. However, in this embodiment, the side walls 207 of each lug are parallel. In addition, the side walls 207 of opposing lugs 206 align. Again, such a configuration can be easily formed at the ferrule open end such as by machining, cutting (e.g. flame cutting), etc.

In this embodiment a radial groove 208 is provided on either side of each ferrule lug 206 where it is connected to a remainder of the ferrule 200. These radial grooves can ensure that there is no point of weakness at this location, which could otherwise result in ferrule failure when it is being secured to the wire rope or in use.

Again, prior to die-pressing the ferrule onto the end of a wire rope, an outwardly facing surface of each ferrule lug 206 may be chamfered 210, with the chamfer extending beyond the lug and into the body of the ferrule. Again, the chamfer 210 on each lug can function to assist with the preservation of a consistent shape of the ferrule 100 after it has been die-pressed onto a wire rope.

As shown in FIG. 11, the socket 220 is modified by providing it with corresponding socket lugs 222. Each socket lug 222 is arranged to locate between adjacent respective ferrule lugs 206 when the ferrule 100 is located in the socket cavity 124 in use. In addition, a "square-sided" recess 226 is defined between each socket lug and into which recess a respective ferrule lug 206 locates in a square fit (i.e. the side walls 207 closely face respective adjacent sides of each recess 226).

Again, such a configuration has been observed to provide very effective mating to stop the ferrule 200 from rotating or twisting within the socket cavity 224, and to allow torque from the wire rope to be on-transferred to the socket.

Again, whilst the ferrule 200 is shown with four lugs 206 spaced equidistantly from each adjacent lug at and around the proximal end, other permutations are possible.

Figure 12:
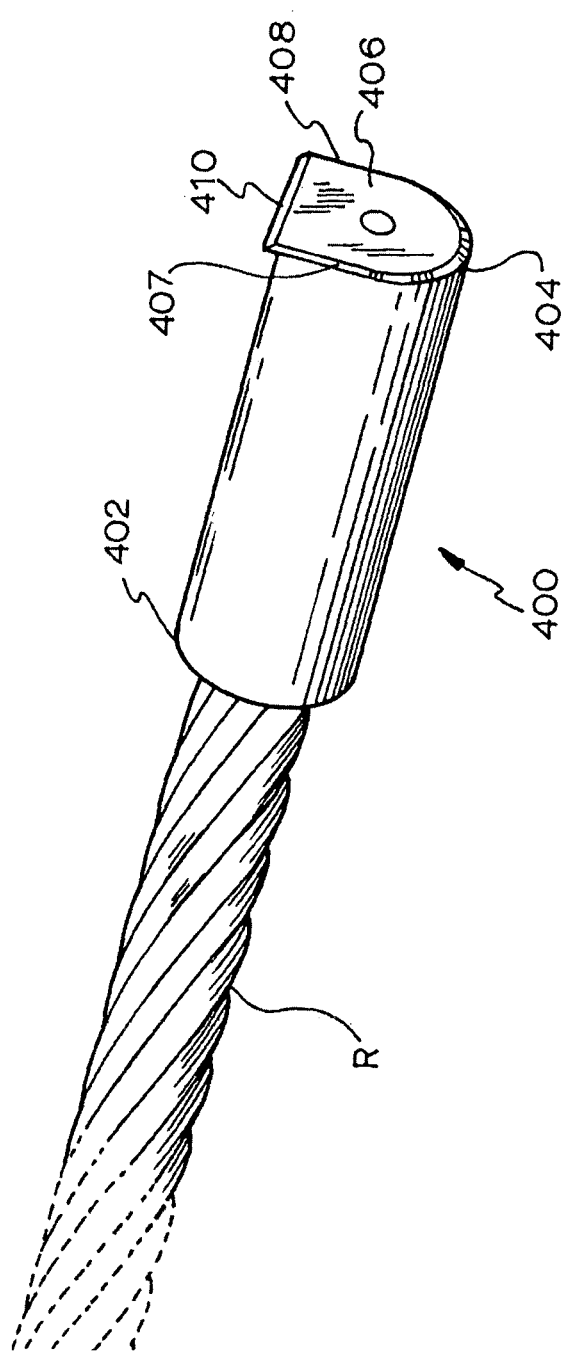
FIG. 12 shows a perspective view of a fourth embodiment of a ferrule secured to an end of a wire rope, to illustrate an alternative formation at a distal end of the ferrule.

Referring now to FIG. 12 a fourth embodiment of a ferrule 400 attached to an end of a wire rope R is shown. The wire rope R is shown having already been received and secured in the open proximal end 402 of ferrule 400. The ferrule 400 also comprises an opposing distal end 404 that is configured for mating engagement with a socket. The socket may or may not require a modified cavity into which the ferrule 400 is to be received.

The ferrule 400 is provided with a U-shaped plate 406, typically welded at its distal end 404. The plate 406 can be easily formed such as by machining, cutting (e.g. flame cutting), etc. Part of an internal edge of the plate 406 may be chamfered or beveled to assist with the welding of the plate onto the ferrule distal end 404.

Opposing sides 407 and 408 of the plate 406 are spaced so as to abut (e.g. interferingly) with correspondingly spaced internal and opposing side walls of the socket. For example, the ferrule distal end 404 may be hammered at upper flat edge 410, or otherwise jammed into the socket, by a suitable tool, to thereby secure the ferrule 400 thereto, thus enabling torque translation between the ferrule and socket.

Non-limiting examples will now be described:

Example 1

A method of securing a ferrule 10 in a socket 50 comprised locating the ferrule so as to mate with the corresponding formation of the socket. In this regard, the ferrule was loaded (e.g. dropped) into the wider cavity section 62 of cavity 51. Usually prior to being so dropped, the ferrule and/or wire rope were first twisted or rotated just a small amount and sufficiently such that two opposing sides (e.g. 23 and 24) of plate 20 aligned with the opposing internal walls (e.g. 53 and 54) of the socket cavity.

The wire rope and/or socket were then pulled (or the ferrule was pushed such as by a tool) so that it moved back axially within cavity 51 to locate in narrower cavity section 64, to be retained under opposed lips 66, 67.

The ferrule was then secured against axial movement within the socket. In this regard, the locking block 30 was located (e.g. dropped) into the wider cavity section 62 of cavity 51. Alternatively, the locking block 30 was already pre-secured to the plate 20, so that it loaded into cavity 51 together with the ferrule 10.

In either case, once the bolt hole 34 of block 30 aligned with the opposed socket holes 60, the bolt 40 was extended through the opposed socket holes 60 and bolt hole 34. When the groove 42 of bolt 40 aligned with the spring-pin hole 35, the spring-loaded retaining pin 37 was urged therein, so that part of its shaft located into groove 42. Thus, the block 30 became secured to the bolt 40, and the bolt became secured to the socket 50. The ferrule 10 and thus wire rope R was now securely connected to and retained in the socket.

The operation and components were observed to be easy to use, robust, reliable and strong.

Example 2

A method of securing a ferrule 100 or 200 in a socket 120 or 220 again comprised locating the ferrule so as to mate with the corresponding formation of the socket. In this regard, the ferrule was again loaded (e.g. dropped) into the wider cavity section of cavity 124 or 224 of socket 120 or 220. Usually prior to being so dropped, or once initially located in the socket, the ferrule and/or wire rope were twisted or rotated just a small amount and sufficiently such that adjacent lugs 106 or 206 could be aligned with (i.e. to locate on either side of) the opposing socket lugs 122 or 222 within the socket cavity 124 or 224.

The wire rope and/or socket were then pulled (or the ferrule was pushed such as by a tool) so that it moved back axially within cavity 124 or 224 to locate in narrower cavity section, to be retained under opposed lips, and so that the lugs 106 or 206 and 122 or 222 intermeshed.

The ferrule 100 or 200 was then secured against axial movement within the socket 120 or 220. In this regard, the locking block 30, spring-pin 37 and locking bolt 40 were employed in a similar manner to Example 1.

Again, the operation and components were observed to be easy to use, robust, reliable and strong.

Whilst specific embodiments of a ferrule and socket have been described, it should be appreciated that the ferrule and socket may be embodied in other forms.

For example, whilst the ferrules 10 and 400 of FIGS. 1 to 5 and 12 are modified at the distal end 14 and 404, whereas the ferrules 100, 200 are modified at the proximal ends 102, 202, a ferrule can be provided that is modified at both distal and proximal ends. These ends can then mate with corresponding opposed formations of a socket, the latter of which themselves may be optionally modified to suit the ferrule. The modification may also be provided at a side wall of the ferrule adjacent to either end thereof (e.g. an in-use upward protrusion that locks into a slot of the socket).

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the ferrule and socket as disclosed herein.

The invention claimed is:

1. A ferrule for attachment to a wire rope end, the ferrule being configured for use with a socket that forms part of a dragline hoist and/or rigging assembly, the ferrule comprising:
   an open end into which the end of the wire rope can be received for securement in the ferrule;
   an end that opposes the open end; and
   an axis extending between the open and opposing ends;
   wherein the ferrule comprises a formation at or around at least one of the open and opposing ends, the formation configured to engage with a corresponding formation of the socket such that, if the ferrule is subjected to a rotating or twisting force within the socket, the formation interferes with the corresponding formation to prevent further rotation or twisting of the ferrule in the socket.

2. The ferrule as claimed in claim 1, wherein the formation at at least one of the open and opposing ends is configured to mate with the corresponding formation of the socket for multiple rotational orientations of the ferrule around its axis.

3. The ferrule as claimed in claim 1, wherein the formation comprises a distinct component that is secured to the opposing end, the component having a polygon-shaped or U-shaped profile wherein at least two opposing sides of the profile are configured to mate with the corresponding formation in the socket in use.

4. The ferrule as claimed in claim 3, wherein the polygon-shaped profile has an even number of sides.

5. The ferrule as claimed in claim 3, wherein the distance between opposing sides in the polygon-shaped or U-shaped profile is equal to or greater than a diameter of the ferrule at the open end.

6. The ferrule as claimed in claim 3, wherein an edge of the component is chamfered around a surface that faces in to secure to the opposing end.

7. The ferrule as claimed in claim 3, wherein the component is formed from a plate to define a squat section.

8. The ferrule as claimed in claim 7, wherein the central opening is a hole having a diameter generally corresponding to the diameter of the wire rope at the opposing end of the ferrule.

9. The ferrule as claimed in claim 1, wherein the formation comprises a series of spaced, discrete lugs that are formed at the open end, the lugs projecting to define a castellated profile at the open end.

10. The ferrule as claimed in claim 9, wherein the corresponding formation of the socket comprises one or more corresponding lugs, each arranged to locate between adjacent respective lugs at the ferrule open end when the ferrule is received in the socket in use.

11. The ferrule as claimed in claim 9, wherein a radius or radial groove is provided on either side of each ferrule lug where it is connected to a remainder of the ferrule.

12. The ferrule as claimed in claim 9, wherein, prior to attaching the ferrule to the wire rope end, an outwardly facing surface of each ferrule lug is chamfered.

13. The ferrule as claimed in claim 9, comprising four lugs spaced equidistantly from each adjacent lug at and around the open end.

14. The wire rope comprising thereon the ferrule as claimed in claim 1.

15. The ferrule as claimed in claim 1 wherein the formation comprises a component that is non-rotatably fixed to an end of the ferrule and that has a shape that corresponds to the shape of the formation of the socket, such that the component engages with the formation of the socket to prevent rotation of the ferrule.

16. A ferrule for attachment to a wire rope end, the ferrule being configured for use with a socket that forms part of a dragline hoist and/or rigging assembly, the ferrule comprising an open end into which the end of the wire rope can be received for securement in the ferrule, wherein the open end comprises a formation that is configured to engage with a corresponding formation of a socket such that, if the ferrule is subjected to a rotating or a twisting force within the socket, the formation interferes with the corresponding formation to prevent further rotation or twisting of the ferrule in the socket.

17. A dragline hoist and/or rigging assembly comprising a ferrule for attachment to a wire rope end, and a component secured to a distal end of the ferrule, the component having a polygon-shaped or U-shaped profile wherein at least two opposing sides of the profile are able to engage with a corresponding formation in a socket in use such that, if the ferrule is subjected to a rotating or twisting force within the socket, the at least two opposing sides of the profile interferes with the corresponding formation to prevent further rotation or twisting of the ferrule in the socket.

18. A method of securing a ferrule in a socket, the ferrule comprising a formation at an open end into which an end of a wire rope can be received for securement in the ferrule; an end that opposes the open end; and an axis extending between the open and opposing ends; wherein the ferrule is configured at or around at least one of the open and opposing ends such that the formation is configured to engage with a corresponding formation of the socket such that, if the ferrule is subjected to a rotating or twisting force within the socket, the formation interferes with the corresponding formation to prevent further rotation or twisting of the ferrule in the socket and wherein the method comprises: locating the ferrule so as to mate with the corresponding formation of the socket; and securing the ferrule against axial movement within the socket.

19. The method as claimed in claim 18, wherein the ferrule is secured against axial movement within the socket using a locking assembly comprising a block that is able to be positioned and secured in the socket adjacent to the opposing end of the ferrule.

\* \* \* \* \*